Figure 1:
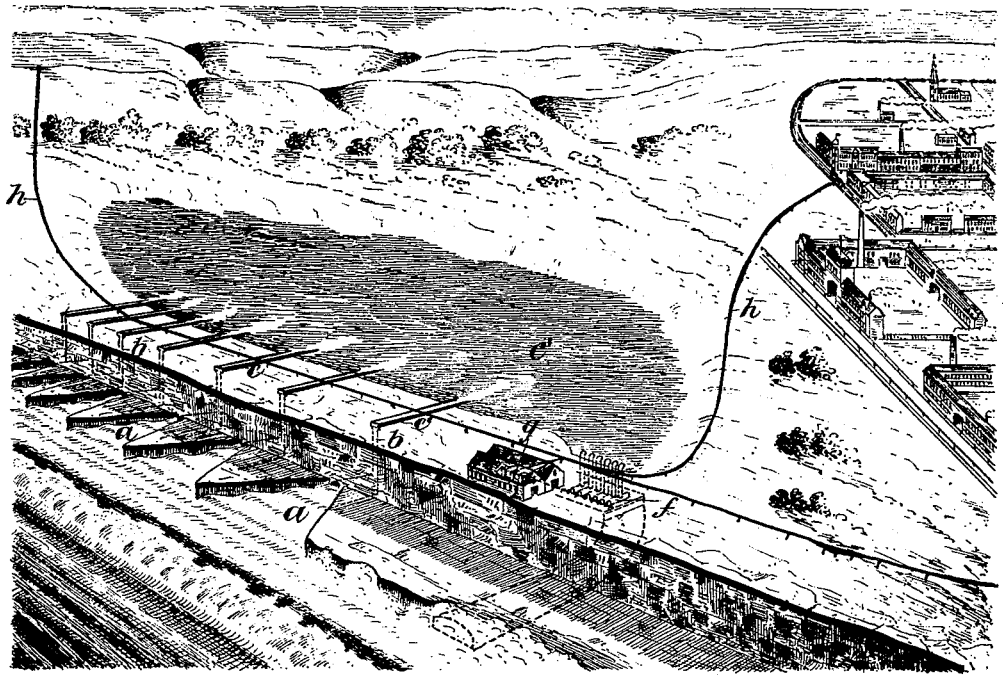

(No Model.) 5 Sheets—Sheet 1.

G. W. BLANKS.
MEANS FOR ELEVATING AND STORING SEA WATER FOR USE AS MOTIVE POWER.

No. 537,000. Patented Apr. 9, 1895.

Witnesses.
W. Walker
J. W. Smith

Inventor.
George Walter Blanks.

(No Model.) 5 Sheets—Sheet 2.

G. W. BLANKS.
MEANS FOR ELEVATING AND STORING SEA WATER FOR USE AS MOTIVE POWER.

No. 537,000. Patented Apr. 9, 1895.

Witnesses
W. Walker
J. W. Smith

Inventor
George Watter Blanks (No Model.)

G. W. BLANKS.

MEANS FOR ELEVATING AND STORING SEA WATER FOR USE AS MOTIVE POWER.

No. 537,000.

5 Sheets—Sheet 3.

Patented Apr. 9, 1895.

Witnesses.

Inventor.
George Walter Blanks.

(No Model.) 5 Sheets—Sheet 4.

G. W. BLANKS.

MEANS FOR ELEVATING AND STORING SEA WATER FOR USE AS MOTIVE POWER.

No. 537,000. Patented Apr. 9, 1895.

Witnesses
W. Walker
J. W. Smith

Inventor
George Watts Blanks

THE NORRIS PETERS CO., PHOTO-LITHO., WASHINGTON, D. C.

(No Model.) 5 Sheets—Sheet 5.
G. W. BLANKS.
MEANS FOR ELEVATING AND STORING SEA WATER FOR USE AS MOTIVE POWER.

No. 537,000. Patented Apr. 9, 1895.

Witnesses
Inventor
George Watter Blanks.

THE NORRIS PETERS CO., PHOTO-LITHO., WASHINGTON, D. C.

UNITED STATES PATENT OFFICE.

GEORGE WALTER BLANKS, OF SYDNEY, NEW SOUTH WALES.

MEANS FOR ELEVATING AND STORING SEA-WATER FOR USE AS MOTIVE POWER.

SPECIFICATION forming part of Letters Patent No. 537,000, dated April 9, 1895.

Application filed September 8, 1894. Serial No. 522,497. (No model.)

*To all whom it may concern:*

Be it known that I, GEORGE WALTER BLANKS, engineer, a subject of the Queen of Great Britain, and a resident of Sydney, New South Wales, have invented a new and useful Improvement in Means to be Employed in Elevating and Storing the Water of the Sea for Use as a Motive Power and for other Purposes, of which the following is a specification.

My invention consists in means to be employed in elevating and storing the water of the sea, for use as a motive power, and for other purposes.

I provide for elevating the water of the sea and storing same in a reservoir of large capacity, and for using it as a motive power, for operating turbines or other water motors; the power from the turbines or other water motors being utilized for operating dynamos or other electric machines, for the generation of electricity, which may be stored, distributed, measured and utilized for electric lighting, for the operation of tramways, railways or as may be required; or I may use the power of the water motors for the compression of air for distribution in mains for hydraulic power, or for refrigerating purposes, for operating machinery, or for any other suitable purpose. I may also use the water elevated from the ocean in the manner hereinafter described, for canals, inland lakes, and the like, or for the production of salt by evaporation or for any other purpose where the water may be profitably used.

In carrying my invention into practice, I select, preferably a rocky position facing the sea, of suitable elevation, the water at the base of the rock being of suitable depth. In the face of the rock I excavate a channel or a series of channels, wide at the mouth and narrow at the back, the bottom being in some cases sufficiently below the sea level, to allow the waves or rollers to rise and fall without breaking, and in other cases high enough to allow the waves or rollers to break before entering the air compressing chambers hereinafter described. At the back of the channel I cut a vertical uptake, and at the back or sides, or at any suitable part of the uptake, I excavate an air compressing chamber (or air compressing chambers) and shape it in such a manner that the entrance is covered and uncovered intermittently by the waves or swell of the sea, and when covered incloses and compresses air in the chamber. The top of the uptake has a delivery bend, the mouth of the outlet being constructed oblong, to prevent as much as possible the return of the water down the uptake after each lift, and to secure as great a head of water in the storage reservoir as possible; or I may place a deflector plate at an angle, on top of the uptake for the same purpose.

I sometimes, if the water in the sea is not of the requisite depth, build out in the sea, the channel, uptake, and air compressing chamber (or air compressing chambers) of concrete, stone or any other suitable material or materials, and construct them strong enough to withstand the roughest seas; and lead the water raised to a storage reservoir by means of a trough. Immediately beneath the outlet of the uptake I provide a trough leading to a storage reservoir, the latter being either a natural catchment or built at a suitable elevation. I cut a trough into which the water from a series of uptakes is delivered, the trough being connected with the storage reservoir, into which the water runs. In most cases I prefer to have the storage reservoir at a low level, say about twenty feet above high tide, but I sometimes provide a high level storage reservoir, into which water may be raised by means of water motors, operated by the overflow from the low water reservoir, if a surplus of water obtains; the water from the high level reservoir being used for high pressure water motors, if at any time there should not be sufficient water in the low level reservoir.

I sometimes construct a high level reservoir fed from uptakes, which in rough seas, will deliver large volumes of water to a great elevation. I also make provision for different states of the tide, by constructing the air compressing chambers at different levels. The air compressing chambers may be of any suitable shape, but I prefer to make them narrower at the back than the front, with the roof higher than the lip at the entrance, and arched, and sloping to the back. The uptakes may be of any shape in plan. I prefer to make them about ten feet in diameter, the length of the channel being approximately one hundred and fifty feet, but these dimensions may be varied to suit requirements. I also provide for the wear which would take place at the lip of the air compressing chamber, and the bottom of the uptake, by cementing in or otherwise securing at these places, metal pieces, preferably non-oxidizable. I also provide in some cases, an adjustable lip of metal or any other suitable material, at the mouth of the air compressing chamber, so that as the tide rises or falls, the lip may be raised or lowered to the position most suitable for the waves or rollers to alternately cover and uncover the entrance to the chamber. In case repairs are necessary I provide a gate for shutting off the water at the channel.

The annexed drawings will facilitate the explanation.

Figure 2:
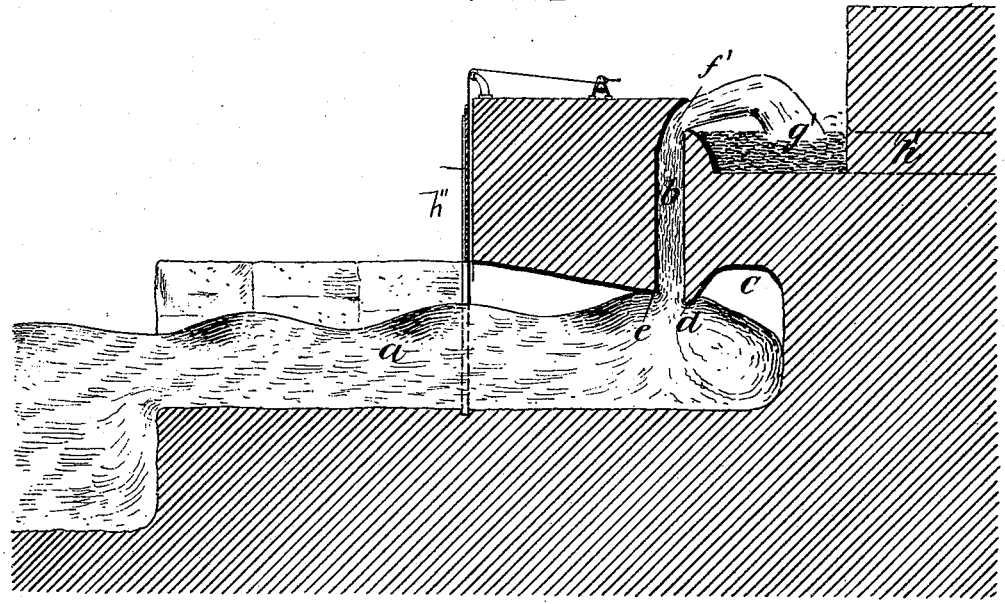
Figure 3:
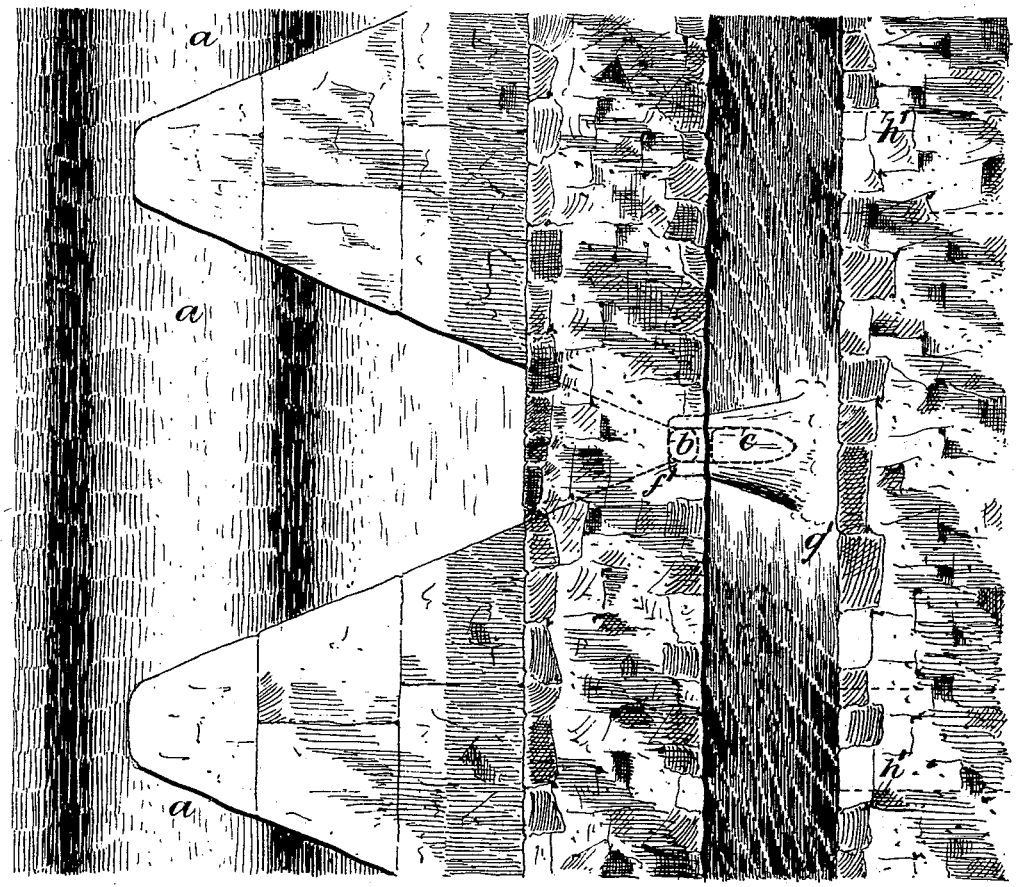
Figure 4:
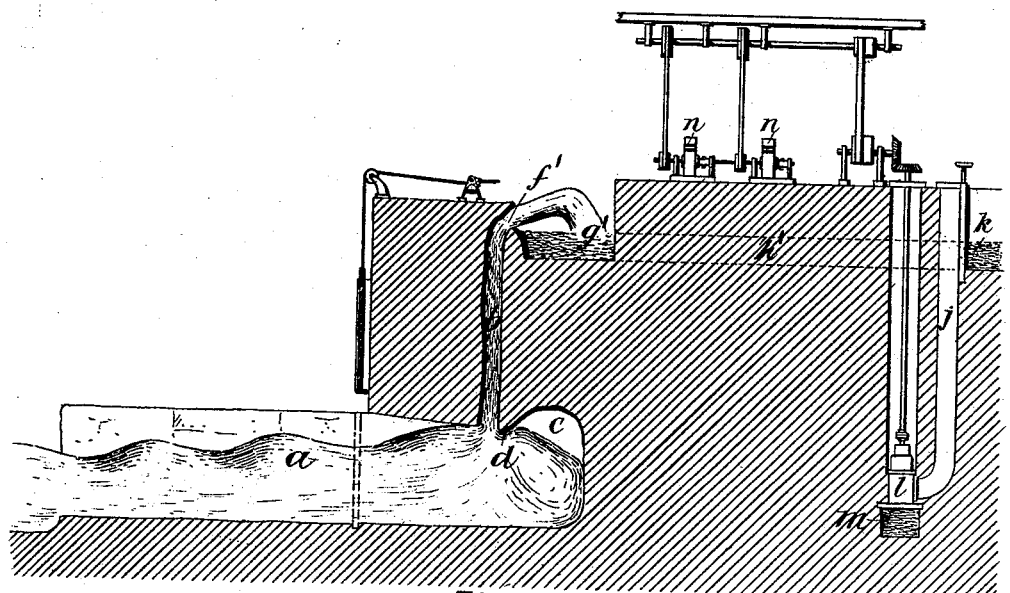
Figure 5:
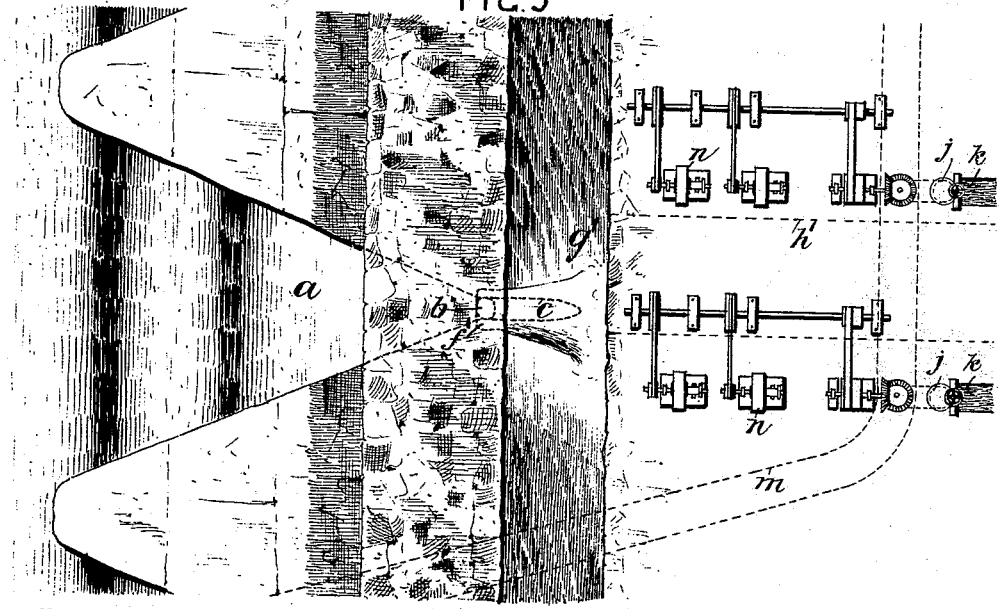
Figure 8:
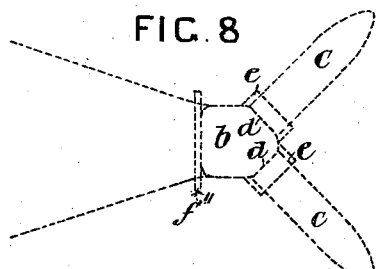
Figure 6:
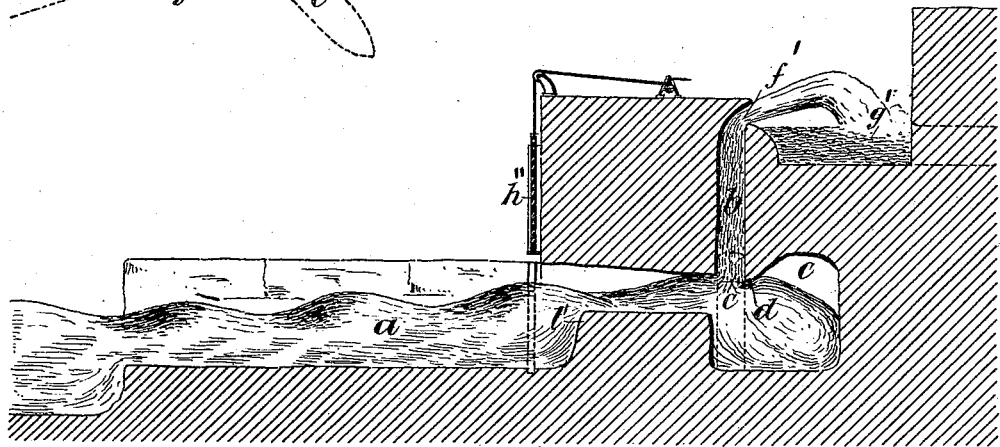
Figure 7:
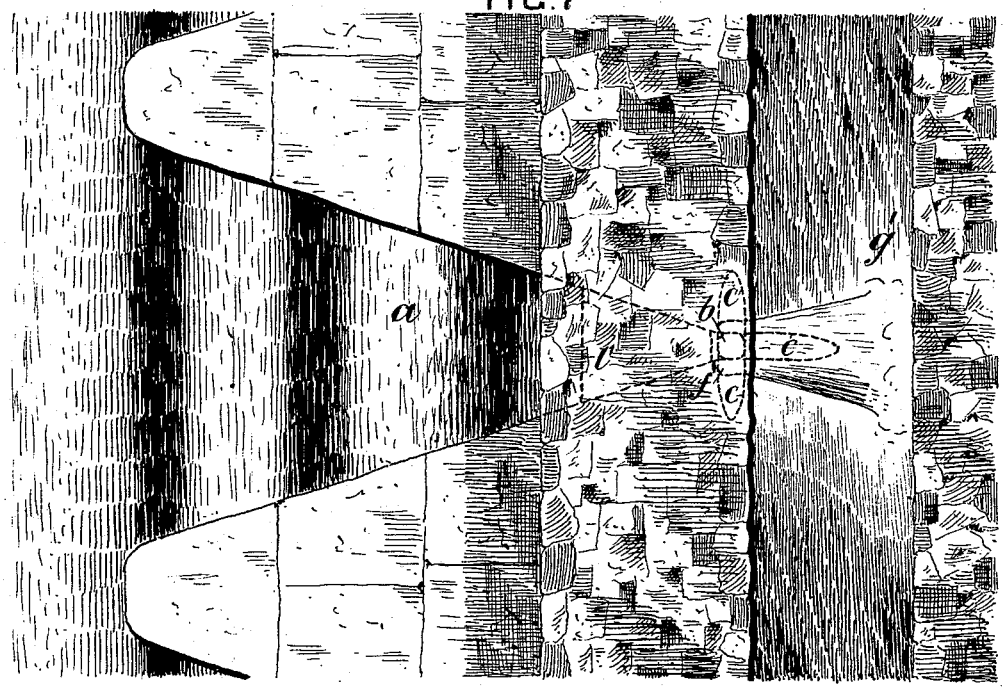
Figure 9:
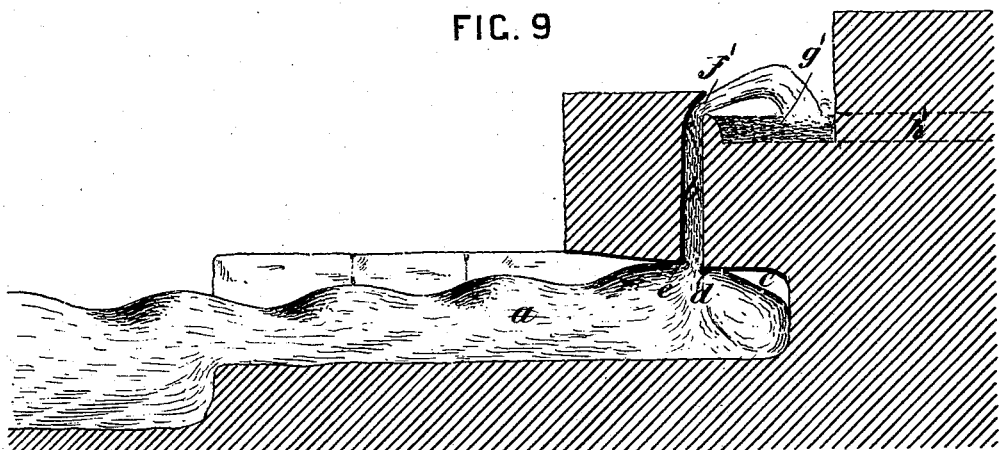
Figure 10:
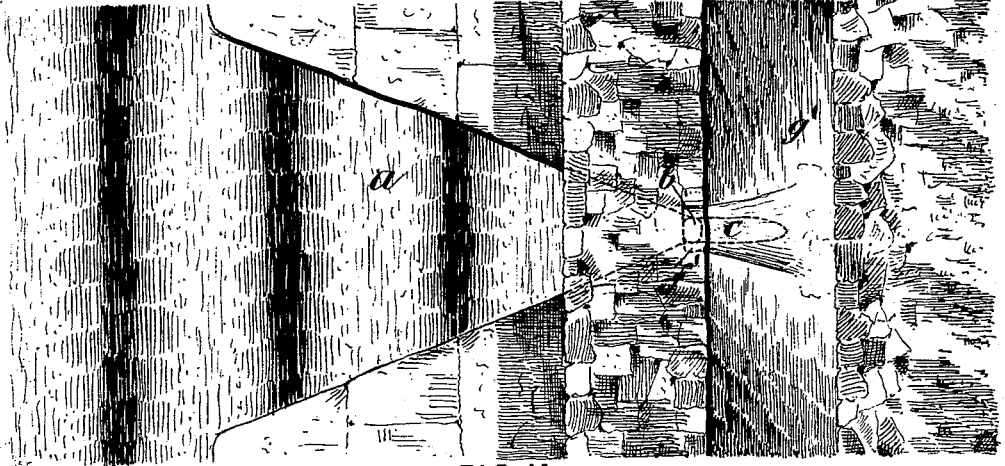
Figure 11:
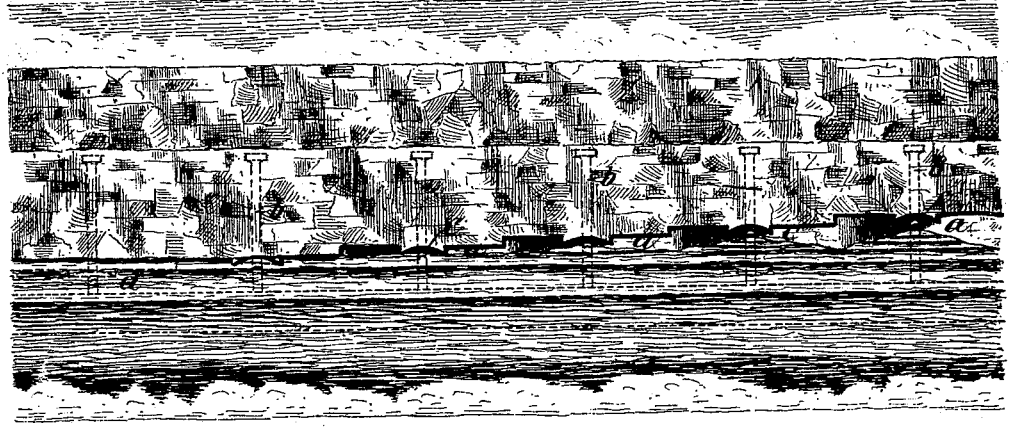

Figure 1 is a bird's eye view of the general arrangement. Figs. 2 and 3 represent a vertical side section and plan, showing the method adopted for compressing air in the chamber by the waves or swell of the ocean in deep water. Figs. 4 and 5 represent a vertical side section and plan, showing water from the storage reservoir operating turbines, the latter being used for operating dynamos for generating electricity. Figs. 6 and 7 represent a vertical side section and plan, showing waves breaking over a barrier, and three air compressing chambers. Fig. 8 is a plan showing two air compressing chambers, on an enlarged scale. Figs. 9 and 10 represent a section and plan showing an air compressing chamber with the roof not higher than the lip at the entrance, which I prefer in rough seas. Fig. 11 is a front elevation of a series of channels and air compressing chambers at different levels to suit various tides.

In Fig. 1 $a$, $a$ represent a series of channels, excavated in the rock; $b$, the uptakes, at the bottom of which are the air compressing chambers. $c'$ are troughs which receive the water from the uptakes and deliver it into the storage reservoir $e'$. $f$ are turbines for operating the dynamos $g$ from which the electricity generated is distributed by the cables $h$.

In Figs. 2 and 3, $a$ is a channel excavated in the rock in deep water, narrow at the back; $b$, the uptake; $c$, the air compressing chamber, the roof of which is higher than the lip $d$ at the entrance. The bottom $e$ of the uptake is made as low as possible, but not low enough to interfere with the entrance of water into the chamber. $f'$ is the delivery bend at top of the uptake $b$, made oblong to prevent as much as possible, water from returning down the uptake, after each lift, and to secure as high a level as possible in the storage reservoir. $g'$ is the trough to receive water from a series of uptakes, whence it falls into a storage reservoir by means of the troughs $h'$. A gate $h''$ is provided for shutting off the water if repairs are needed. In this case but one air compressing chamber is shown.

In Figs. 4 and 5, $a$ is a channel in deep water, wide at the front and narrow at the back; $b$, the uptake; $c$, the air compressing chamber, the roof of which is higher than the lip $d$ at the entrance. $f'$ is the oblong outlet or delivery bend at top of the uptake. $g'$ is the trough to receive water from uptakes, which travels by means of troughs $h'$ to a storage reservoir. Water from the storage reservoir is shown entering the pipes $j$ by means of the races $k$, which after operating the turbines or water motors $l$, is delivered in the tail race $m$ which is preferably below the level of the sea. $n$, $n$ represent dynamos operated by means of shafting and belting from the water motors $l$, the electricity generated being utilized as required.

In Figs. 6 and 7, $a$ represents a channel, wide at the front and narrow at the back; $b$, the uptake; $c$, $c$, $c$, air compressing chambers; $d$, a lip at the entrance of each chamber; $f'$, the oblong outlet or delivery bend at top of the uptake; $g'$, the trough to receive water from the uptakes, which is lead to the storage reservoir. $h''$ is a gate for shutting off the sea in case repairs are needed. In this case I have shown a barrier $l'$ across the channel $a$, for rollers or waves to break before reaching the compressing chambers.

Fig. 8 is a plan, in which two air compressing chambers $c$, $c$, are shown, the lips $d$ at the entrance of each being protected by metal or other suitable material, the bottom of the front of the uptake $b$ being protected in a similar manner by the metal plate $f''$, which is built in or otherwise secured.

In Figs. 9 and 10, the air compressing chamber $c$ is shown with the roof level with the lip $d$ at the entrance. The reference letters for similar parts are the same as in Figs. 2 and 3.

In Fig. 11, $a$ are the channels, $b$ the uptake and $c$ the air compressing chambers at different levels, to suit various tides.

I will further explain the invention.

In Figs. 2, 3, 4, and 5 the waves or rollers, do not break in the channel $a$ but rise and fall, and rapidly concentrate their energy beneath the uptake $b$ and inside the air compressing chamber $c$, the air being driven out of the chamber until the water rises above the lip $d$, when the top of the wave or roller is retarded, and the heavy body of water beneath, travels quickly forward inside the chamber $c$, compressing the inclosed air, until the pressure is so great, that it suddenly expands or explodes, and forces water out of the chamber $c$, which, meeting the incoming wave or roller, displaces and lifts with great velocity, a large body of water through the uptake $b$, where there is the least resistance; and delivers it into the trough $g'$, whence it gravitates to a storage reservoir by means of the troughs $h'$. As the wave or roller recedes, the lip $d$ of the compressing chamber $c$ is uncovered, leaving it open for a fresh charge of air and water. This operation is repeated intermittently and rapidly.

In Figs. 4 and 5 I have shown water from the storage reservoir operating the turbines or water motors *l* and returning to the ocean by the tail race *m*, which is preferably below the level of the ocean level. The turbines or water motors *l* are shown driving dynamos by means of intermediate gear. The electricity generated may be used for electric lighting, operating tramways, railways or for any other suitable purpose.

In Figs. 6 and 7, I have shown a barrier *l'* across the channel *a* to break waves or rollers, before reaching the entrance of the air compressing chambers *c, c, c*; waves of oscillation being thus converted into waves of translation. In this case too the lips *d* are covered as the water rises, and air is compressed in the chambers. When three air compressing chambers are used, at the bottom of the uptake *b* the expansion of the compressed air inclosed in the chambers forces water toward the center of the uptake, and meeting the incoming wave or roller displaces and raises a large body of water through the uptake *b* where there is the least resistance. The object of this arrangement is to obviate loss of effect which may happen by water being injected from the back air compressing chamber into the channel *a* instead of through the uptake. The water raised is delivered into the trough *g'* from the bent delivery *f'* and gravitates to the storage reservoir, for use as required. I have shown a gate *h''* for shutting off the sea, if repairs should be needed.

In Fig. 8 two air compressing chambers *c* are shown at the bottom of the uptake *b*, the lips *d* at the entrance of each chamber being protected by metal or other suitable material to prevent as much as possible, the wear which would take place at these places. The bottom of the front of the uptake *b* is similarly protected by the plate *f''* which is built in the rock or otherwise secured.

In Figs. 9 and 10, the roof of the air compressing chamber *c* is shown level with the lip *d* at the entrance. This form of chamber is used for high seas, which traveling in the channel *a* with great velocity, cover the mouth of the chamber before the air can escape, when the water is forced through the uptake *b* as before described.

In Fig. 11 I have shown a series of air compressing chambers *c* at different levels, with their respective channels *a* and uptakes *b*. I make this provision so that if the tide is at any level, one or more of the air compressing chambers *c* will be charged, and water lifted through the uptake *b*.

Having now particularly described and ascertained the nature of my said invention and the manner in which the same is to be performed, I declare that what I claim is—

1. In combination with a channel wide at its mouth and narrow at its back, an air chamber forming an extension of said contracted channel and an uptake intermediate of the inlet and air chamber, substantially as described.

2. In combination with a flaring channel, an air chamber forming a continuation of the same, an intermediate uptake, said uptake having a curved upper end, substantially as described.

3. A channel wide at the mouth and narrow at the back, across which is a barrier, for breaking the waves or swell of the sea before reaching the compressing chamber or compressing chambers, in combination with an air compressing chamber or air compressing chambers, an uptake having a delivery bend at the top and a storage reservoir substantially as described and shown on the drawings.

In testimony that I claim the foregoing as my invention I have signed my name, in presence of two witnesses, this 6th day of August, 1894.

GEORGE WALTER BLANKS.

Witnesses:
W. WALKER,
F. W. SMITH.